United States Patent [19]

Rutgersson

[11] Patent Number: 4,479,289
[45] Date of Patent: Oct. 30, 1984

[54] FASTENER INTENDED ESPECIALLY FOR CANVAS

[76] Inventor: Göran Rutgersson, Ekebacken, S-440 30- Marstrand, Sweden

[21] Appl. No.: 451,748

[22] Filed: Dec. 21, 1982

[30] Foreign Application Priority Data

Dec. 28, 1981 [SE] Sweden .............................. 8107803

[51] Int. Cl.³ .................... A44B 13/00; A44B 17/00
[52] U.S. Cl. ...................................... 24/687; 24/688; 24/689; 24/692
[58] Field of Search ................. 24/689, 690, 692, 698, 24/699, 700, 703, 566, 682, 687, 688

[56] References Cited

U.S. PATENT DOCUMENTS

| 9,029 | 1/1880 | Acker | 24/689 |
|---|---|---|---|
| 66,413 | 7/1867 | Talcott | 24/689 |
| 447,346 | 3/1891 | Pringle | 24/692 |
| 770,955 | 9/1904 | Bradley | 24/687 |
| 885,434 | 4/1908 | Carr | 24/689 |
| 1,656,037 | 1/1928 | Carr | 24/689 |
| 1,891,013 | 12/1932 | Reiter | 24/689 |
| 2,041,606 | 5/1936 | Hofmann | 24/688 |
| 2,106,728 | 2/1938 | Fenton | 24/692 |
| 3,196,512 | 7/1965 | Koehl | 24/689 |
| 3,466,714 | 9/1969 | Nysten | 24/689 |

Primary Examiner—Victor N. Sakran

[57] ABSTRACT

Fastener intended for canvas comprising a sleeve (10) with a tubular portion (11) which is intended to extend through a hole in the canvas material (22), also a flange portion (12,24) on each side of the material. Between these flange portions there is canvas material with an area around the said hole where a ring-shaped surface is arranged to press against the surface of the material so that a friction connection is formed. The surface, which is preferably located on a separate ring (1), is provided with projections which are arranged to be pressed into the material (22) under the influence of the force from the flange portions so that the positive connection is furthermore formed. A supporting ring (17) is arranged to be present on the opposite side of the material (22) as related to the surface provided with projections. The supporting ring is made from a material which has such a hardness as compared with the material in the projections that it can be inserted in the ring thus providing an anchorage for the outer portions of the projections.

8 Claims, 13 Drawing Figures

FASTENER INTENDED ESPECIALLY FOR CANVAS

The following invention relates to a fastener for canvas or the like and having the shape for example of a reinforcing grommet.

In canvas, e.g. sail canvas or canvas for covers, fasteners of different types are present. A customary arrangement is the reinforcing grommet which is anchored on the surface of the canvas and forms a hole through which a rope can be drawn. Alternatively the fastener can have the form of half a press stud, a clincher or some form of lock. Fasteners of similar form can also be present with laminated material, e.g. plywood or plastics.

In many cases such fasteners are subjected to severe forces. This is particularly the case with sail canvas, tent canvas and covers for vehicles. In such cases stringent requirements are imposed that the fastener be properly anchored in the canvas. It is impossible merely to employ a hole for the anchorage in such cases, and instead the fastener must be firmly bonded to one surface of the canvas at the fixing point, usually a ring-shaped surface around a hole in the canvas. A hole is of cource practically essential if the fastener is to be able to have two portions, located on either side of the canvas, and furthermore many fasteners are provided with a through hole, e.g. as is the case with a ring. Fasteners which are capable of withstanding considerable forces without loosening or without the canvas being damaged are already known. In one customary type which is employed for medium stresses, a sleeve is flanged around the edge of a hole in the canvas on both sides of the latter and compressed with great force so that the area of the canvas around the hole is held in place by friction. With, for example, sails and large tents this however has not proved sufficient, particularly with extremely thick canvas having high tear resistance. Consequently another type of fastener arrangement has evolved in which the loosening forces in the canvas are increased by employing not only friction but also positive locking by means of toothed rings which, as a result of the sleeve being pressed together, are pressed in so that the teeth enter the surface of the canvas. With these known forms however such rings have been produced by diecasting, so that steel cannot be used, as no other method has been discovered for making the rings at a reasonable cost. However, disadvantages have been encountered partly because of the fact that the metals suitable for diecasting have relatively low mechanical strength because corrosion can easily occur because it was necessary to pair these rings with sleeves of stainless steel which is the only material having adequate mechanical strength for the purpose.

The aim of the invention is to provide a fastener for canvas or other thin layers designed to accomodate severe stresses and which does not exhibit the disadvantages mentioned above of the known arrangements.

Another aim is to provide an arrangement which is suitable for canvas of widely varying thickness.

A further aim of the invention is to provide a fastener with a flanged sleeve in which the risk of damage to the canvas, e.g. by cutting through it, due to the flanging of the sleeve is essentially eliminated.

The aim of the invention is achieved in that the fastener which is provided with projections proceeding from a surface, and which is arranged to be pressed into the material under the effect of force so that a positive connection is formed, includes a supporting ring made from material which has a hardness such in relation to the material in the projections that this can be inserted in the ring, thus anchoring the outer portions of the projections.

Three embodiments of the invention, with the first having three variations in dimension are described in the following and illustrated on the drawings in which FIGS. 1 and 2 show a portion of the fastener in two production stages;

Figure 10:
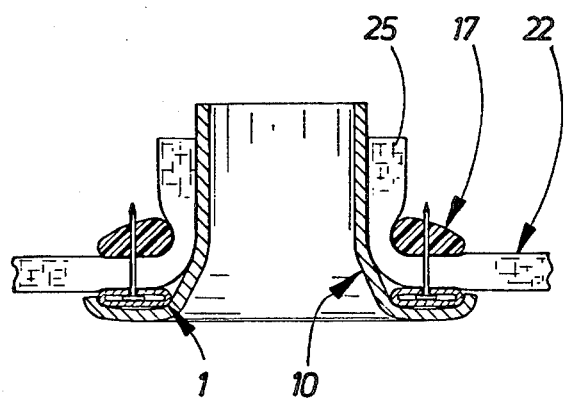
Figure 11:
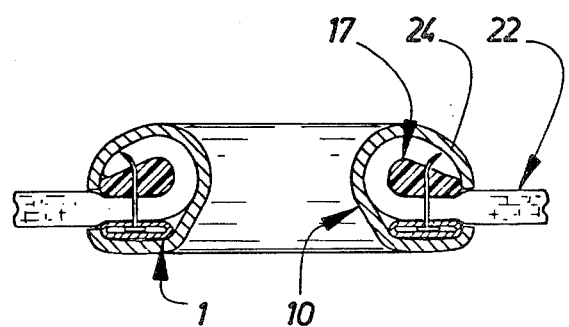

FIGS. 10 and 11 illustrate the third embodiment in two production stages. In addition, FIGS. 12 and 13 illustrate a further embodiment of the portion shown in FIGS. 1 and 2, the two diagrams illustrating two production stages.

All embodiments relate to a reinforcing grommet of circular shape and all diagrams are central sections.

Figure 1:
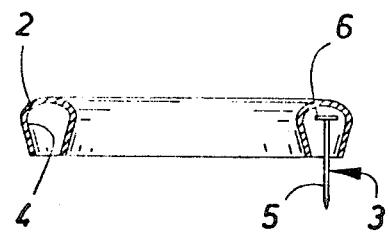
Figure 2:
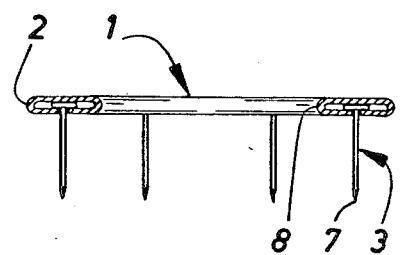

FIG. 2 illustrates a reinforcing grommet 1 which forms part of all embodients. This consists of a flattened ring 2, made preferably of stainless steel, and a number of relatively narrow and flexible pins 3 which project from the ring, these too being made preferably of stainless steel. As shown in FIG. 1 the ring 2 in an initial stage is horseshoe-shaped in cross-section and thus forms a trough 4 which is open to one side. When ring 2 is in this stage the pin 3 is introduced, which has a shank 5 and a head 6, the head being located inside the trough 4 while the shank projects outwards through its mouth. The pin is held in this position after which the ring 2 is knocked together to give the shape illustrated in FIG. 2. The edges of the ring around the previous trough opening form only a narrow aperture thorugh which the shank 5 projects. The heads 6 are pressed in between the inner walls of the ring so that the pin 3 is still held with the shank 5 pointing in the axial direction. The shank 5 has tips 6 and inside the ring 2 a hole 8 is formed.

Figure 12:
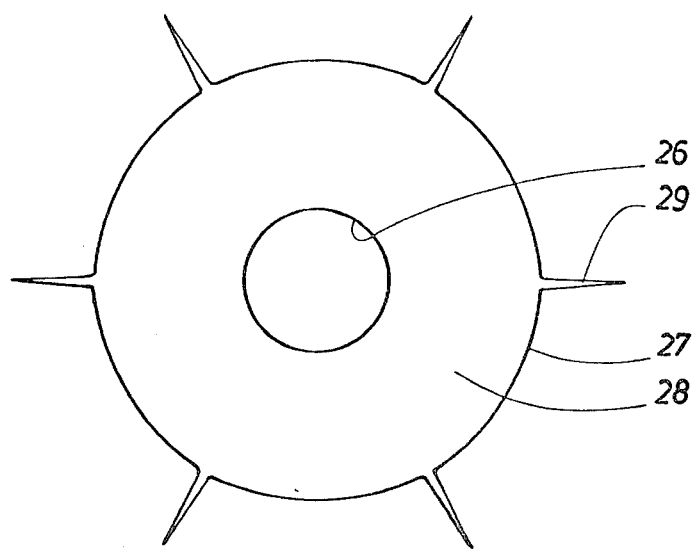
Figure 13:
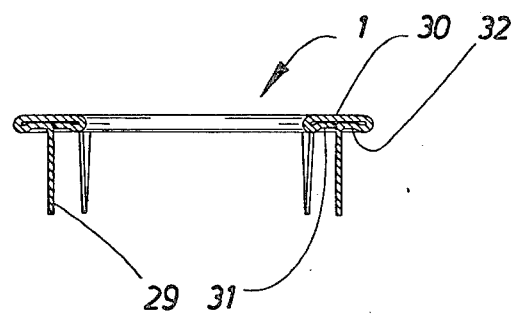

FIGS. 12 and 13 illustrate a second embodiment of the portion described in conjunction with FIGS. 1 and 2, the reinforcing grommet 1 (the same notation has been retained). FIG. 12 illustrates a blank for the ring 1, the blank consisting of a relatively thin metal disc with a circular hole 26. The blank is bordered by a circular edge 27 which is concentric with the hole, so that a ring-shaped portion, a metal blank ring 28, is formed. A number of thin pointed tags 29 which are stamped out from the metal simultaneously with the remaining contours project from the outer edge 27.

To get the ring 1 in the state shown in FIG. 13 the inner part of the ring 28 is rolled over and outwards to the position shown in FIG. 13 while the outer part of ring 28 is rolled over inwards to the position shown in FIG. 13. By this means one side 30 of the finished ring is formed from the centre part of ring 28 of the blank while an opposing inner part 31 of the outer side of the ring is formed from the inner edge portion of blank ring 28. An outer portion 32 of the other side of the ring which is similarly opposite to portion 30 is formed from the other edge portion of the blank ring 28. The tags 29 are bent upwards in such a way that they point straight out from the side of the ring formed by portions 31 and 32. Thus the tags are located adjacent to a gap between these two portions. For the sake of clarity the number of tags has been limited to six, but in actual practice the number can be considerably greater. They have been shown as proceeding solely from the outer edge 28, but tags can also be arranged at the edge of the hole 26.

It is important for functioning that the tags 29 are not located near the edge of the ring. The tags can be moved inwards by folding portion 32 inwards, which at the same time strengthens the ring. Corresponding strengthening can be achieved by folding in portion 31, as shown, which can be done even if this portion does not carry any tags. However, such inward folding of a portion ot provided with tags is not absolutely essential, the rings instead being to some extent of plain material.

The reinforcing grommet as shown in FIG. 13 and described above, is as comparison indicates very similar to the reinforcing grommet shown in FIG. 2 and already described. Both rings also perform the same function and consequently the pin 3 and the tags 29 also have the same function. Thus the difference is governed mainly by production aspects. In the following description of the complete fastener also in the associated drawings, reference is made solely to the ring in accordance with FIG. 2. However, this can be replaced by the ring in accordance with FIG. 13 without this signifying any changes as such.

Figure 3:
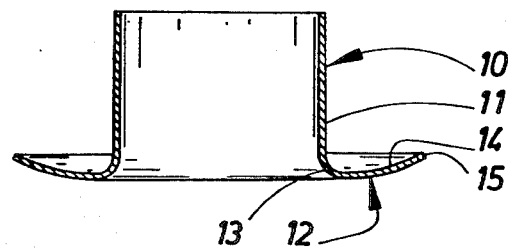
FIG. 3 illustrates a second portion of the arrangement in an initial production stage.

FIG. 3 illustrates a second part of the fastener, a sleeve 10. This is provided with a cylindrical or slightly tapered tubular portion 11, from one far end of which a collar 12 projects. The collar 12 joins the tubular portion 11 with a small radius 13 and changes into a cup-shaped portion 14 which, with increasing angle towardsits edge 15, turns axially in the same direction as the extension of the tubular portion 11. Thus the collar has a surface which slopes in relation to the axial plane. The sleeve 10 is appropriately made from stainless steel and must be capable, from the material compatibility viewpoint, of being paired with the reinforcing grommet 1.

Figure 4:
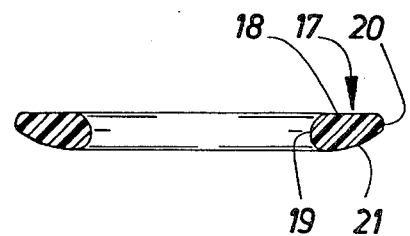
FIG. 4 illustrates a third portion of the arrangement.

FIG. 4 illustrates a third portion of the arrangement, a supporting ring. The ring 17 is relatively thick and has an initial, flat side 18 which by radii connects with a cylindrical hole 19 through the ring and with an outer edge 20 of the ring. The opposite side 21 of the ring is arched in such a way that the thickness of the ring reduces towards the outer edge 20. The surface 21 is connected by radii to the hole 19 and the outer edge 20. The supporting ring 17 must permit the pin 3 to be pushed through it and hence must be made of relatively soft material. A hard plastics, such as amide plastics is suitable for this purpose and plastics material will not give rise to corrosion when together with the components previously mentioned. In certain cases other materials are also feasible, for example a soft light metal or a composite material such as plastics and metal together. The ring 17 is present in all embodiments and variations, apart from that shown in FIG. 5. Furthermore all diagrams 5-11, where the fastener is illustrated assembled or partially assembled, the material shown in which the arrangement is to be attached is a canvas 22.

In the various application cases illustrated in FIG. 5-11 the said components can have somewhat differing design, dependent mainly on the thickness of the canvas 22 and the treater holding strength required with increased canvas thickness. Inspite of these differences, the various components of the fastener have been given the same notation, likewise the canvas 22. This applies also to the edges 23 of a hole which is punched out in the canvas 22.

With all embodiments assembly is carried out by pushing the tubular portion 11 of the sleeve 10, on which initially the ring 17 is threaded with its arched side 21 towards the collar 12, through the said hole with edges 23 which has been punched through the canvas 22. As with the components of the fastener, the hole must be circular. The reinforcing grommet 1, the hole 8 of which has sufficient tolerance for this purpose, is pushed around the tubular portion. Thus the ring 1 is located on one side of the canvas with the pin 3 directed towards the canvas. The ring 17 is located on the other side of the canvas. The flat face 18 of the ring rests against the canvas. The assembly procedure described relates to the embodiments shown in FIG. 6 and 7, i.e. for medium-thick canvas. When the components are brought together, the tubular portion 11 of sleeve 10 must be flanged. This takes place in a press in which the collar 12 is supported on a pad while a mandrel is introduced into the hole until it reaches the tubular portion 11. The mandrel has, in a known manner, a rounded collar which causes flanging of the tubular portion 11, and at the same time the ring 1 is pressed towards the collar 12. The pin 3 is pressed initially through the canvas and then into the ring 17.

If the canvas 22 is of such limited thickness that the length of the pin 3 exceeds the total thickness of the canvas and ring 17, the pin will meet the sloping surface 14 of the collar 12 and as a result will be bent inwards. If on the other hand the canvas is so thick that together with the thickness of ring 17 its thickness exceeds the length of the pin, its tips 17 will terminate inside the ring 17. The flanging of the tubular portion 11 occurs with such force that the canvas 22 is pressed with great force firmly between ring 1 and ring 17, so that a friction connection is obtained. Furthermore the canvas is pierced by the pin 3. These can be many in number (in FIG. 2 relatively few pins have been illustrated for reasons of clarity), which provides positive anchorage of the canvas. The pins are supported at both ends by anchorage in the two rings 1 and 17.

Figure 6:
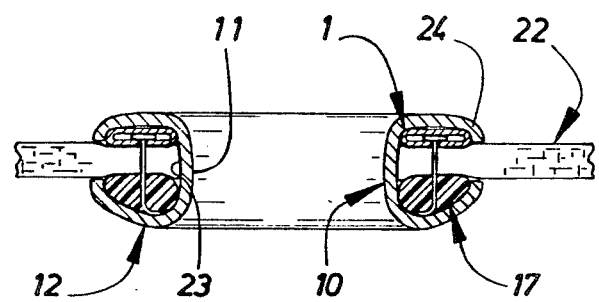
FIG. 6 shows a variation of the first embodiment dimensioned for canvas of medium thickness.
Figure 7:
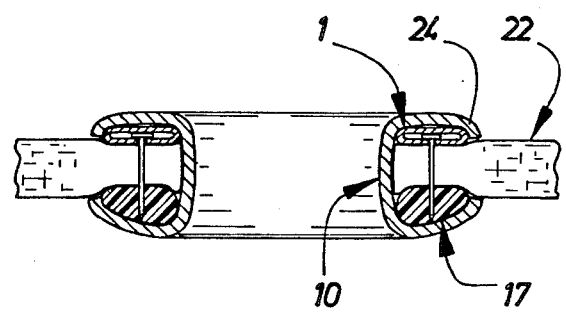
FIG. 7 illustrates a third variation of the first embodiment dimensioned for thick canvas.

As shown in FIG. 6 and 7, rings 1 and 17 form distance pieces for the flanged portions, on the one hand the original collar 12 and secondly the collar formed by the tubular portion 11, designated in the diagrams as 24. This provides room for the inward folding of these flanged portions, and the edge collar 12 is also subjected to a certain degree of inward folding in the said pad so that rings 1 and 2 are correctly held and protected. In spite of this inward folding of the edges, the distance obtained between the edge of the material of the sleeve and the canvas is such that there is no risk of the canvas being damaged or cut through by the edges which have been pressed downwards with considerable force.

Figure 5:
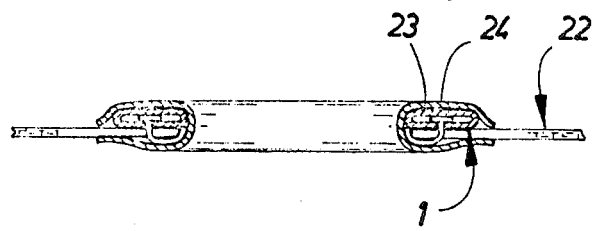
FIG. 5 illustrates the arrangement complete in accordance with the first embodiment dimensioned for relatively thin canvas.

The embodiment illustrated in FIG. 5 relates to a relatively thin canvas and as a result the forces involved are not so great. Hence the material of the sleeve 10 can be made relatively thin and thus more malleable. By this means during flangeing the collars 12 and 23 can be provided with an outwardly bent edge, rather than an inwardly bent edge, which runs parallel with the canvas 22. With such a procedure and with correct design of the pad and mandrel so that no great pressure is imposed on the edge of the collars, there is no risk of the canvas being cut through. Thanks on the one hand to this fact and secondly as a result of the reduced forces, the ring 17 can be dispensed with. Consequently the pin 3 will be bent around the canvas, as shown in FIG. 4, due to the effect of the slope of collar 12.

Figure 8:
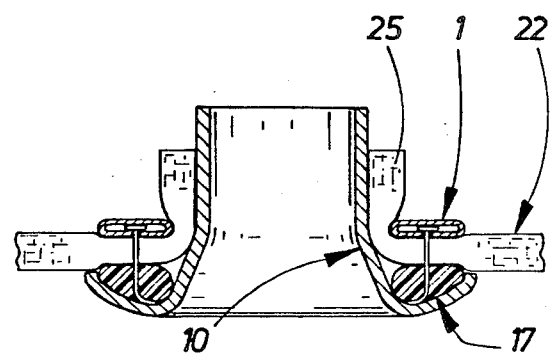
FIGS. 8 and 9 illustrate the second embodiment in two assembly stages.
Figure 9:
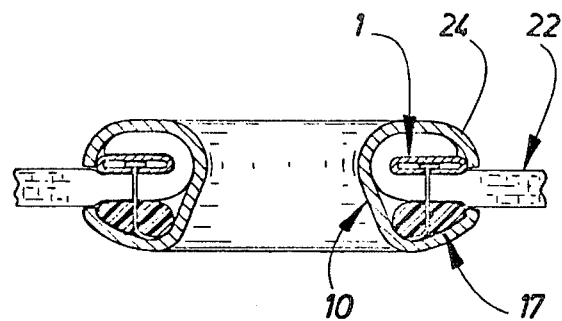

In the embodiment illustrated in FIG. 8, 9 the hole with edge 23 has been made smaller than the diameter of the tubular portion 11 of the sleeve 10. To ensure that even so it will be possible to thread the canvas onto this portion, the edges of the hole have been provided with radial slots, the outer confines of which connect to form a circular line, corresponding approximately to the diameter of portion 11. Thus when threading on the canvas a projecting portion 25 is obtained which, during the flangeing of the sleeve, is folded over the ring 1 in the manner illustrated in FIG. 9. This provides a further increase in the anchorage force, because the portion of the canvas around the hole is friction-connected over a larger surface than is the case with the embodiment as shown in FIGS. 5–7, while at the same time the friction forces are further increased by edge friction against the inner edge of ring 1.

In the embodiment in FIG. 8, 9 the components have been placed in the same sequence as with the embodiment in FIG. 6, 7. However they can also be placed in the reverse order as shown in FIG. 10. During flange formation the ends of the pin 3, which might project from the ring 17, will be bent outwards and hence will be pushed into the overlapping portion 25 of the canvas, which is simultaneously bent outwards. Such outward bending would naturally also be obtained with an embodiment as shown in FIG. 5, but where the ring 1 had been placed against the collar as shown in FIG. 10.

Further variations are also feasible within the framework of the following patent claims. Thus an embodiment with overlapping portion 25 of canvas 22 is possible also with the component sequence as shown in FIG. 5–7. It is also feasible to connect at least some of the components with each other instead of making them as separate units. It is also feasible to design the arrangement with two rings having pins on each side of the material. With the embodiments described one reinforcing grommet has been provided. However, the fastener can be also designed in other ways so that for example the collar 12 carries a lock, a bolt or other fixing device. It is also possible to use the hole which, in the case of a ring is intended for pulling a rope through, for the attachment of a lock, a bolt or some other arrangement. As mentioned in the preamble, the fastener can also be employed for materials other than canvas. Fittings have been fastened in plywood and other timber materials by means of the technique which the present invention aims at improving, and consequently the invention can be employed in such cases. It has been mentioned that the reinforcing grommet in accordance with the specification is circular. This, or some other arrangement, can however have elliptical or polygonal form. The materials stainless steel and plastics have been mentioned merely by way of example and can be replaced by other materials, such as various metals.

I claim:

1. Fastener, especially for canvas or other thin material such as laminated material and comprising a sleeve (10) having a tubular portion (11) which in use extends through a hole (23) in the material (22) and a flange portion (12, 24) on both sides of the material, the material being located with an area around the said hole between said flange portions, a pair of ring-shaped surfaces respectively arranged to press against the opposite surfaces of said material, one of said ring-shaped surfaces being provided with projections (3) arranged to be pressed through the material and the other ring-shaped surface being formed on a supporting ring (17) made from a material which has a lower hardness in comparison with the material of the projections, said projections being inserted into the material of said supporting ring, through the supporting ring and bent on the outside of said ring, one of said flange portions being associated with said one ring-shaped surface and another of said flange portions being associated with the outside of said supporting ring, said flange portions being connected by said tubular portion and being pressed in a direction against said canvas or other thin material thereby exerting a pressure of said ring-shaped surfaces against the surfaces of said canvas or other thin material and a pressure against the portions of said projections which are bent on the outside of said supporting ring.

2. Fastener according to claim 1 wherein the projections are located on a separate ring (1).

3. Fastener according to claim 2 wherein said separate ring (1) and said supporting ring (17) form distance members which permit the respective edge portions of said flange portions (12, 24) to be folded inwards towards said canvas or other thin material without penetrating the surface of the canvas or other thin material.

4. Fastener according to claim 2 or 3, wherein the canvas or other thin material nearest to the edge of the hole (23) comprises an area (25) which is located inside an inner edge of one of the rings (1,17), the canvas or thin material area being in a flat state and re-bent over said one ring whereby said area is located between one surface of said one ring and the flange portions (12,24) associated with said one ring and a portion of said canvas or thin material located outside said area is located between a second surface of said one ring and the flange portion associated with the other ring via said other ring.

5. Fastener according to claim 2, wherein the projections of said separate ring (1) are formed by pins (3) of a flexible material having a length such that they extend through and with a considerable margin extend out from the canvas or thin material when said one ring-shaped surface is pressed against the canvas or thin material so that a positive connection is formed by the pins extending through the canvas or thin material and an anchorage of said pins on both sides of the material comprising firstly in the said separate ring (1) and secondly by means of the outer portions of the pins being anchored in said supporting ring (17).

6. Fastener according to claim 5, wherein said separate ring (1) is formed from a blank ring (28) of a thin, malleable material such as a plate, said pins comprising tags (29) which are stamped out of the material comprising the blank ring and projecting from at least one (32) of the edge portions thereof, said one edge portion being folded over from a portion of the blank ring which forms one side (30) of the finished blank ring, and said tags being bent outwards to a position wherein they project from the other side of the finished ring, said one folded over edge portion (32) at least partially forming the other side of the finished ring, and another folded over edge portion (31) of said blank ring forming the remainder of the other side of the finished ring.

7. Fastener according to claim 5, wherein said separate ring (1) is formed from a thin malleable material such as plate having a center portion forming one side of the ring and edge portions which are folded over to form the other side of the ring, said edge portions facing each other and being separated by a slot, said pins (3) extending through the slot and each comprising a shank of a nail-like member and a head (6) on the shank, the heads of the pins being located between the sides of the ring and the shanks of the pins extending outwardly through the said slot.

8. Fastener, especially for canvas or other thin material such as laminated material and comprising a sleeve (10) having a tubular portion (11) which in use extends through a hole (23) in the material (22) and a flange portion (12,24) on both sides of the material, the material being located with an area around the said hole between said flange portions, and a ring-shaped surface arranged to press against a surface of the material to form a friction connection, said ring-shaped surface being provided with projections (3) which are arranged to be pressed into said material under the effect of force from the flanged portions to furthermore form a positive connection, said ring-shaped surface being on a ring (1) which is formed from a blank ring (28) of a thin, malleable material such as a plate, said projections comprising tags (29) which are punched out from the blank ring material and projecting from at least one (32) of the edge portions thereof, said one edge portion being folded over from a portion of the blank ring which forms one side (30) of the finished blank ring, and said tags being folded outwards to a position wherein they project from the other side of the finished ring, said one folded over edge portion (32) at least partially forming the other side of the finished ring and another folded over edge portion (31) of said blank ring forming the remainder of the other side of the finished ring.

* * * * *